United States Patent [19]

Beyer et al.

[11] Patent Number: 5,148,180
[45] Date of Patent: Sep. 15, 1992

[54] METHOD AND APPARATUS FOR PASSIVE DIRECTION FINDING WITH SIDEBAND DETERMINATION

[75] Inventors: Ralph K. Beyer; Robert E. Hunt, both of Ridgecrest, Calif.

[73] Assignee: The United States of America as represented by the Secretary of the Navy, Washington, D.C.

[21] Appl. No.: 729,741

[22] Filed: Jul. 15, 1991

[51] Int. Cl.⁵ ............................................... G01S 5/04
[52] U.S. Cl. ................................................... 342/437
[58] Field of Search ................. 342/432, 434, 437, 445

[56] References Cited

U.S. PATENT DOCUMENTS 4,305,074 12/1981 Barzana et al.
4,870,420 9/1989 Apostolos ........................... 342/432
5,010,343 4/1991 Andersson ........................... 342/432

Primary Examiner—Theodore M. Blum
Attorney, Agent, or Firm—Harvey A. Gilbert; Melvin J. Sliwka; John L. Forrest, Jr.

[57] ABSTRACT

A method and apparatus are provided for passive direction finding that determines the sideband and angle of arrival of an incoming radio signal. A four-channel superheterodyne receiver generates quadrature between the radio signals received by each channel. Four inphase/quadrature phase detectors are connected to the receiver for generating inphase and quadrature components of the electrical phase differences between antenna elements of the receiver. The inphase and quadrature components are used for sideband determination and the electrical phase differences are used to derive the angle of arrival.

8 Claims, 1 Drawing Sheet

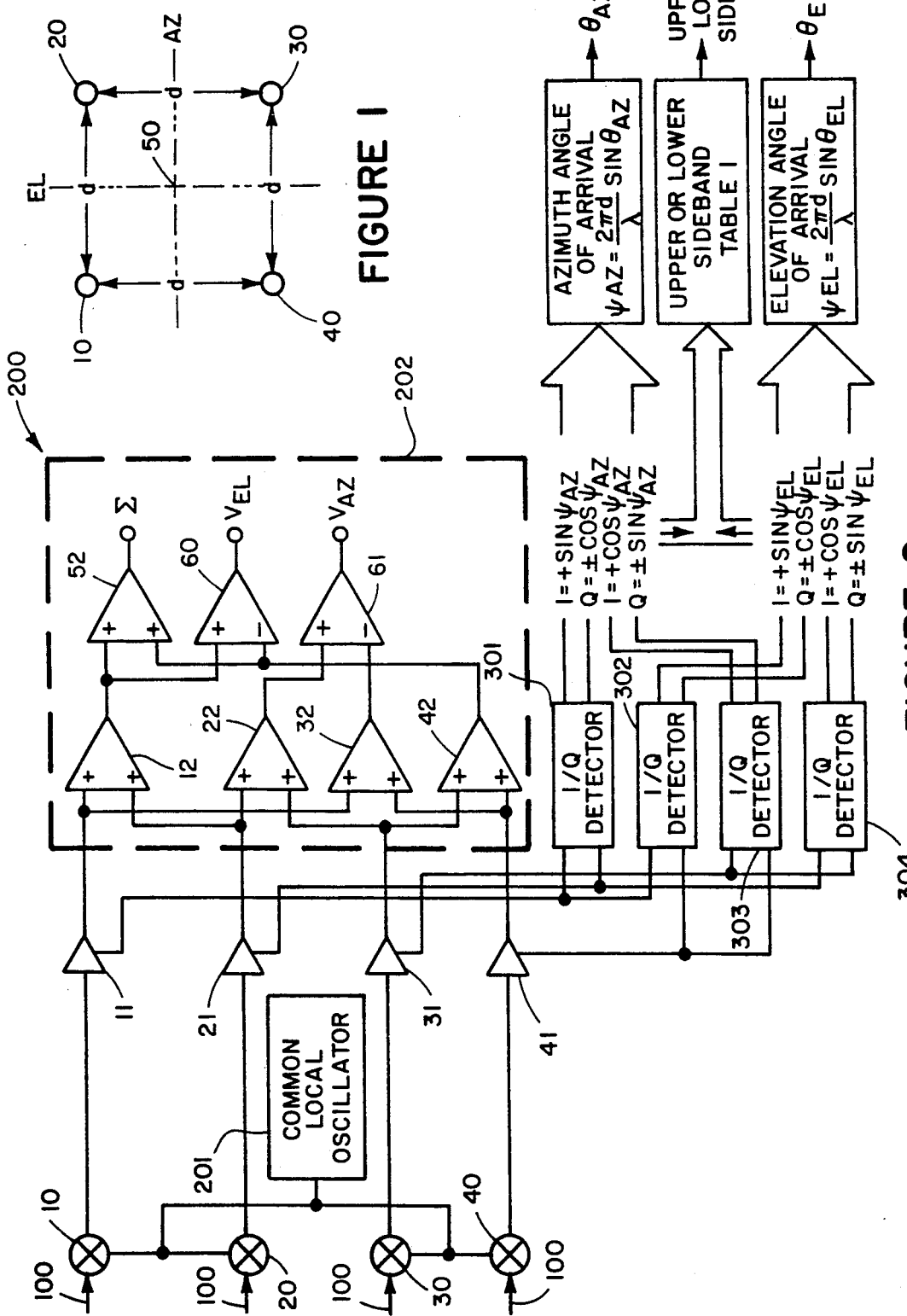

METHOD AND APPARATUS FOR PASSIVE DIRECTION FINDING WITH SIDEBAND DETERMINATION

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to passive direction finding techniques and more particularly to a method of passive direction finding with sideband determination.

BACKGROUND OF THE INVENTION

In modern warfare, missiles are usually launched in the general direction of a target by a radar system that acquires the target, feeds initial coordinates about the target to the missile prior to launch, and then continues to transmit guidance signals to the missile enroute to the target. However, the missile system acquisition and guidance radar is subject to detection by passive tracking systems since its radar radiates energy. Passive direction finding systems have been used in the past as an "antiradiation" technique for direction finding and steering to a target. For small missiles, physical size necessitates the use of correspondingly small on-board antennas operating at high frequencies to reduce wavelength-associated dimensions. These concepts have prompted the development of small, highly accurate passive direction finding systems.

One type of passive direction finding system is a four-channel superheterodyne receiver. This type of receiver is typically used to provide broad radio frequency (RF) band coverage while using the selectivity of narrow band intermediate frequency (IF) components by tuning a local oscillator over the broad RF band. A common problem with this type of system is that it responds to RF spaced the intermediate frequency above and below the local oscillator frequency. Therefore, the response can provide ambiguous RF information if the upper and lower sidebands of the incoming signal are not identified.

Present methods of providing sideband identification make use of preselector filters, image rejection mixers and dithering of the local oscillator frequency. Preselector filters used for broad RF band applications usually require a high intermediate frequency. These filters are lossy and occupy extra space in the direction finding system. Further, the high intermediate frequency reduces the selectivity achievable. Thus, the overall system loses sensitivity because of the lossy preselector filters and the higher noise figures associated with the high intermediate frequency amplifiers.

Image rejection mixers are also lossy components and occupy more space than conventional mixers. Furthermore, image rejection mixers must also be used in each channel. However, if space is economized by using only a single channel, there will be a loss in both sensitivity and symmetry. Therefore, symmetrical arrangements, although requiring a greater amount of space, are used because of their tolerance of systematic errors since channel-to-channel tracking reduces the measurement error. Finally, techniques requiring the dithering of the local oscillator are unacceptable because of the time involved. This is especially true in many direction finding applications that require real-time information on every pulse.

SUMMARY OF THE INVENTION

Accordingly, it is the object of the present invention to provide a method and apparatus for passive direction finding that is capable of determining the upper and lower sideband of the incoming RF signal.

It is a further object of the present invention to provide a method and apparatus for passive direction finding that maximizes sensitivity while minimizing system losses.

Still another objection of the present invention is to provide a method and apparatus for passive direction finding that achieves an economy of space heretofore never achieved.

Other objects and advantages of the present invention will become more obvious hereinafter in the specification and drawings.

In accordance with the present invention, a method and apparatus are provided for passive direction finding that determines the sideband and angle of arrival of an incoming radio signal. A superheterodyne receiver having four antenna elements spatially arranged as an array about a boresight of the receiver is used to receive the incoming radio signal. The receiver is then tuned to a selected frequency and electrical phase differences between the antenna elements are measured with four phase detectors. The measured phase differences consist of inphase and quadrature components used to determine the sideband of the incoming radio signal. The measured phase differences are then used to generate the angle of arrival of the incoming radio signal with respect to the boresight of the receiver. Thus, the same phase detectors may be used for determining both the sideband and angle of arrival.

BRIEF DESCRIPTION OF THE DRAWINGS

FIG. 1 is a schematic view showing the head-on relationship of each of the four antenna elements of a superheterodyne receiver in the azimuth-elevation plane according to the present invention; and FIG. 2 s a schematic view of the functional components of the superheterodyne receiver configured with inphase/quadrature detectors according to the present invention.

DETAILED DESCRIPTION OF THE INVENTION

Referring now to the drawings and in particular to FIG. 1, a schematic view shows the head-on relationship of four antenna elements 10, 20, 30, and 40 of a superheterodyne receiver. The four antenna elements are arranged to form a square array having sides of length d as shown. Typically, the four antenna elements are symmetrically balanced about, and squinted from, the boresight 50 of a projectile (not shown) such as a missile. Accordingly, the square formed by the four antenna elements lies in the azimuth-elevation plane which is normal to the boresight 50. Each side of the square array is arranged to traverse only one-dimension in the azimuth-elevation plane.

The four antenna elements 10, 20, 30, and 40 receive incoming radio frequency (RF) signals 100 as shown in FIG. 2. FIG. 2 schematically depicts the functional components of the superheterodyne receiver, designated generally by numeral 200, according to the present invention. Note that the four antenna elements are drawn in a linear alignment only to facilitate the description of the method and apparatus of the present invention.

As in any conventional superheterodyne receiver, a common local oscillator 201 is provided and connected as shown to tune receiver 200 to a selected frequency. The signals received at each of the antenna elements are inputted to respective logarithmic intermediate frequency (IF) amplifiers 11, 21, 31, and 41. These amplifiers are conventional devices which provide: 1) a logarithmic output for amplitude information and 2) a limited output which can be used for phase detection.

In order to generate quadrature between the radio signals 100 received by each antenna element 10, 20, 30, and 40, it is necessary to rotate one of the antenna elements 90° away from the remaining antenna elements. An alternative method of achieving quadrature would be through the power distribution circuit of the common local oscillator 201. Four inphase (I) and quadrature (Q) detectors 301, 302, 303, and 304 (hereinafter referred to as I/Q detectors) may then be connected as shown to generate electrical phase differences between the four antenna elements. The I/Q phase detectors provide outputs which are functions of the sines and cosines of the electrical phase difference $\psi$.

In particular, I/Q detector 301 is connected to generate inphase and quadrature components based on electrical phase differences between antenna elements 10 and 20 in the azimuth plane. I/Q detector 302 is connected to generate inphase and quadrature components based on electrical phase differences between antenna elements 10 and 40 in the elevation plane. I/Q detector 303 is connected to generate inphase and quadrature components based on electrical phase differences between antenna elements 30 and 40 in the azimuth plane. Finally, I/Q detector 304 is connected to generate inphase and quadrature components based on electrical phase differences between antenna elements 20 and 30 in the elevation plane.

For upper/lower sideband determination, a first side of the square array is selected. By way of example, the first side selected is the side that encompasses antenna elements 10 and 20. A second side of the square array is then selected such that the second side is parallel to the first side. Accordingly, the second side encompasses antenna elements 30 and 40. By comparing the signs of the inphase component of one side with the quadrature component of the other parallel side, one can easily determine if the selected frequency of the common local oscillator 201 is in the upper or lower sideband of the incoming radio signal 100. In order to perform such sign comparison, I/Q detectors 301-304 are connected as described above. The required comparisons will now be described with the aid of Table 1.

TABLE 1

|  | UPPER SIDEBAND | LOWER SIDEBAND |
| --- | --- | --- |
| I/Q DETECTOR 301 | I = + sin $\psi_{AZ}$ | I = + sin $\psi_{AZ}$ |
|  | Q = + cos $\psi_{AZ}$ | Q = − cos $\psi_{AZ}$ |
| I/Q DETECTOR 302 | I = + sin $\psi_{EL}$ | I = + sin $\psi_{EL}$ |
|  | Q = + cos $\psi_{EL}$ | Q = − cos $\psi_{EL}$ |
| I/Q DETECTOR 303 | I = + cos $\psi_{AZ}$ | I = + cos $\psi_{AZ}$ |
|  | Q = + sin $\psi_{AZ}$ | Q = − sin $\psi_{AZ}$ |
| I/Q DETECTOR 304 | I = + cos $\psi_{EL}$ | I = + cos $\psi_{EL}$ |
|  | Q = + sin $\psi_{EL}$ | Q = − sin $\psi_{EL}$ |

For example, if both the inphase component of I/Q detector 301 and the quadrature component of I/Q detector 303 are positive, then the selected frequency is in the upper sideband of the incoming radio signal 100. However, if the signs are opposite, then the selected frequency is in the lower sideband of the incoming radio signal 100. Note that the same results are obtained if the quadrature component from I/Q detector 301 and the inphase component from I/Q detector 303 are used. A similar comparison using I/Q detectors and 304 would produce the same results for sideband determination.

The electrical phase difference $\psi_{AZ}$ and $\psi_{EL}$ may then be used to determine the angle of arrival of the incoming radio signal 100. The angle of arrival in the azimuth and elevation planes $\theta_{AZ}$ and $\theta_{EL}$, is based on the wavelength $\lambda$ of the incoming radio signal 100, the distance d between antenna elements in the receiver and electrical phase differences $\psi_{AZ}$ and $\psi_{EL}$ in the azimuth and elevation planes. This is a well-known relationship in the direction finding field and is written mathematically as follows:

$$\psi_{AZ} = \frac{2\pi d}{\lambda} \sin \theta_{AZ} \qquad (1)$$

$$\psi_{EL} = \frac{2\pi d}{\lambda} \sin \theta_{EL} \qquad (2)$$

Thus, the determination of the angle of arrival and sideband are accomplished with the same I/Q detectors. Furthermore, unambiguous phase information from $\psi = -180°$ to $+180°$ may be determined in the azimuth plane by using the inphase components from I/Q detector 301 and 303 and for the elevation plane by using I/Q detectors 302 and 304. Phase ambiguities beyond $\psi = -180°$ and $+180°$ may be resolved with amplitude information obtained by a variety of conventional methods/apparatus, one of which will be described briefly hereinbelow.

Referring again to FIG. 2, amplitude generator 202 is provided as part of receiver 200 to generate amplitude information about the incoming radio signal 100 to resolve electrical phase ambiguities over a large field of view. In particular, amplifiers 12, 22, 32, 42, and 52 generate a logarithmic sum $\Sigma$ of the amplitudes at the four antenna elements. The $\Sigma$ signal would normally be used for thresholding. Differential amplifiers 60 and 61 are provided and connected as shown to provide voltages $V_{EL}$ and $V_{AZ}$. $V_{EL}$ and $V_{AZ}$ provide a well-known rough angle measurement which can be used to resolve the phase ambiguities beyond $\psi = -180°$ and $+180°$. This amplitude information is a result of logarithmic processing of the antenna data for elements squinted from the boresight. The details of this circuitry and processing may be found on pages 30-31 in the book "Microwave Passive Direction Finding" by Stephen E. Lipsky, Wiley Publishing Co., 1987.

The advantages of the present invention are numerous. Use of electrical phase differences between antenna elements provides an instantaneous indication whether the incoming radio signal is in the upper or lower sideband. The electrical phase differences are also used to derive the angle of arrival of the incoming radio signal. Thus, the system achieves maximum sensitivity and symmetry because no lossy preselector filters or image rejection mixers are required. Physical size of the apparatus is economized since the same I/Q detectors may be used for both sideband and angle of arrival determination. Finally, conventional methods and apparatus used to generate amplitude information to resolve ambiguities is easily adapted to the present invention.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of passive direction finding that determines the sideband and angle of arrival of an incoming radio signal, comprising the steps of:

receiving the incoming radio signal with a superheterodyne receiver having four antenna elements spatially arranged as an array about a boresight of the receiver;

turning the receiver to a selected frequency;

measuring electrical phase differences having inphase and quadrature components;

determining the sideband of the incoming radio signal by comparing the signs of the inphase component of one side of the antenna and the quadrature component of the other parallel side of the antenna with the following table:,

|  | UPPER SIDEBAND | LOWER SIDEBAND |
|---|---|---|
| I/Q DETECTOR 301 | I = +sin $\psi_{AZ}$<br>Q = +cos $\psi_{AZ}$ | I = +sin $\psi_{AZ}$<br>Q = −cos $\psi_{AZ}$ |
| I/Q DETECTOR 302 | I = +sin $\psi_{EL}$<br>Q = +cos $\psi_{EL}$ | I = +sin $\psi_{EL}$<br>Q = −cos $\psi_{EL}$ |
| I/Q DETECTOR 303 | I = +cos $\psi_{AZ}$<br>Q = +sin $\psi_{AZ}$ | I = +cos $\psi_{AZ}$<br>Q = −sin $\psi_{AZ}$ |
| I/Q DETECTOR 304 | I = +cos $\psi_{EL}$<br>Q = +sin $\psi_{EL}$ | I = +cos $\psi_{EL}$<br>Q = −sin $\psi_{EL}$ | and generating the angle of arrival of the incoming radio signal with respect to the boresight of the receiver from said electrical phase differences using the equation $\psi_{AZ}=(2\pi D/\lambda)$ SIN$\phi_{AZ}$ to calculate the azimuth angle of arrival $\phi_{AZ}$ and the equation $\psi_{EL}=(2\pi D/\lambda)$ SIN$\phi_{EL}$ to calculate the elevation angle of arrival $\phi_{EL}$.

2. A method as in claim 1 wherein said step of receiving further includes the step of arranging the antenna elements of the array as square array in an azimuth-elevation plane normal to the boresight such that each side of the square array traverses only one-dimension in the azimuth-elevation plane, the square array being further symmetrically disposed about the boresight.

3. A method as in claim 2 wherein said step of sideband determination further includes the steps of:

selecting a first side of the square array encompassing a first pair of adjacent antenna elements from the four antenna elements;

selecting a second side of the square array parallel to said first side, said second side encompassing a second pair of adjacent antenna elements from the four antenna elements; and comparing the sign of the inphase component between said first pair of antenna elements with the sign of the quadrature component measured between said second pair of antenna elements wherein the selected frequency is in an upper sideband of the incoming radio signal if the signs are the same and in a lower sideband if the signs are opposite.

4. A method according to claim 1 further comprising the step of determining the amplitude of the incoming radio signal at each antenna element, wherein the amplitudes are used to resolve ambiguity in the angle of arrival.

5. An apparatus for passive direction finding that determines the sideband and the angle of arrival of an incoming radio signal, comprising:

a four-channel super heterodyne receiver for receiving the incoming radio signal and for generating quadrature between the radio signals received by each channel, said receiver including a square, four-element antenna array; and a plurality of phase detectors connected to said receiver for generating inphase and quadrature components of electrical phase difference between said antenna elements wherein said inphase and quadrature components are used for sideband determination by comparing the signs of the inphase component of one side of the antenna and the quadrature component of the of the parallel side of the antenna with the following table:

|  | UPPER SIDEBAND | LOWER SIDEBAND |
|---|---|---|
| I/Q DETECTOR 301 | I = +sin $\psi_{AZ}$<br>Q = +cos $\psi_{AZ}$ | I = +sin $\psi_{AZ}$<br>Q = −cos $\psi_{AZ}$ |
| I/Q DETECTOR 302 | I = +sin $\psi_{EL}$<br>Q = +cos $\psi_{EL}$ | I = +sin $\psi_{EL}$<br>Q = −cos $\psi_{EL}$ |
| I/Q DETECTOR 303 | I = +cos $\psi_{AZ}$<br>Q = +sin $\psi_{AZ}$ | I = +cos $\psi_{AZ}$<br>Q = −sin $\psi_{AZ}$ |
| I/Q DETECTOR 304 | I = +cos $\psi_{EL}$<br>Q = +sin $\psi_{EL}$ | I = +cos $\psi_{EL}$<br>Q = −sin $\psi_{EL}$ | and said electrical phase difference are used for angle of arrival determination using the equation $\psi_{AZ}=(2\pi D/\lambda)$ SIN$\phi_{AZ}$ to calculate the angle of arrival $\phi_{AZ}$ and the equation $\psi_{EL}=(2\pi D/\lambda)$ SIN$\phi_{EL}$ to calculate the elevation angle of arrival $\phi_{EL}$.

6. An apparatus as in claim 5 further comprising means, connected to said receiver, for generating amplitude information about the incoming radio signal wherein said amplitude information is used to resolve ambiguities in the angle of arrival.

7. An apparatus as in claim 5 wherein said square, four-element antenna array lies in a azimuth-elevation plane normal to a boresight of said receiver, said square array further being symmetrically balanced about said boresight such that each side of said square array traverses only one dimension in the azimuth-elevation plane whereby said electrical phase differences have an azimuth-component and an elevation-component.

8. An apparatus as in claim 7 wherein said plurality of phase detectors comprises four phase detectors connected such that said inphase and quadrature components are generated for each side of said square array, each side encompassing a pair of two adjacent antenna elements from said four-element antenna array, wherein a sign of an inphase component generated for a first side of said square array is compared with a sign of a quadrature component generated for a second side of said square array, said second side being parallel to said first side and said comparison being made to determine whether the incoming radio signal is upper or lower sideband in accordance with the relationships of the inphase and quadrature components of said signal in the following table:

| | UPPER SIDEBAND | LOWER SIDEBAND |
|---|---|---|
| I/Q DETECTOR 301 | I = +sin $\psi_{AZ}$ | I = +sin $\psi_{AZ}$ |
| | Q = +cos $\psi_{AZ}$ | Q = −cos $\psi_{AZ}$ |
| I/Q DETECTOR 302 | I = +sin $\psi_{EL}$ | I = +sin $\psi_{EL}$ |
| | Q = +cos $\psi_{EL}$ | Q = −cos $\psi_{EL}$ |
| I/Q DETECTOR 303 | I = +cos $\psi_{AZ}$ | I = +cos $\psi_{AZ}$ |
| | Q = +sin $\psi_{AZ}$ | Q = −sin $\psi_{AZ}$ |
| I/Q DETECTOR 304 | I = +cos $\psi_{EL}$ | I = +cos $\psi_{EL}$ |
| | Q = +sin $\psi_{EL}$ | Q = −sin $\psi_{EL}$ |

* * * * *